(12) United States Patent
Stewart et al.

(10) Patent No.: US 7,277,954 B1
(45) Date of Patent: Oct. 2, 2007

(54) TECHNIQUE FOR DETERMINING MULTI-PATH LATENCY IN MULTI-HOMED TRANSPORT PROTOCOL

(75) Inventors: Randall A. Stewart, Crystal Lake, IL (US); Peter P. Lei, Arlington Heights, IL (US); Ken A. Morneault, Marshall, VA (US)

(73) Assignee: Cisco Technology, Inc., San Jose, CA (US)

( * ) Notice: Subject to any disclaimer, the term of this patent is extended or adjusted under 35 U.S.C. 154(b) by 1062 days.

(21) Appl. No.: 10/135,081

(22) Filed: Apr. 29, 2002

(51) Int. Cl.
*G06F 15/16* (2006.01)
*G06F 15/173* (2006.01)

(52) U.S. Cl. ..................................... 709/230
(58) Field of Classification Search ............... 709/238, 709/230
See application file for complete search history.

(56) References Cited

U.S. PATENT DOCUMENTS

| | | | |
|---|---|---|---|
| 6,363,416 B1 * | 3/2002 | Naeimi et al. ............ | 709/209 |
| 6,665,702 B1 * | 12/2003 | Zisapel et al. ............ | 718/105 |
| 6,751,738 B2 * | 6/2004 | Wesinger et al. ......... | 726/14 |
| 6,804,783 B1 * | 10/2004 | Wesinger et al. ......... | 726/11 |
| 6,912,222 B1 * | 6/2005 | Wheeler et al. .......... | 370/395.31 |
| 7,006,433 B1 * | 2/2006 | Dantu et al. ............. | 370/218 |
| 7,111,035 B2 * | 9/2006 | McClellan et al. ....... | 709/201 |
| 2002/0112071 A1 * | 8/2002 | Kim ......................... | 709/238 |
| 2002/0186654 A1 * | 12/2002 | Tornar ..................... | 370/225 |
| 2003/0120716 A1 * | 6/2003 | McClellan et al. ....... | 709/201 |
| 2003/0188035 A1 * | 10/2003 | Lubbers et al. .......... | 709/310 |
| 2003/0195984 A1 * | 10/2003 | Zisapel et al. ............ | 709/238 |

FOREIGN PATENT DOCUMENTS

WO WO9831125 A1 * 7/1998

OTHER PUBLICATIONS

Kohler et al., Datagram Control Protocol (DCP), Internet Engineering Task Force, ICIR, pp. 1-54, Mar. 1, 2002.
R. Stewart et al., "Stream Control Transmission Protocol", Network Working Group, RFC 2960, pp. 1-134, Oct. 2000.

* cited by examiner

*Primary Examiner*—David Wiley
*Assistant Examiner*—Douglas Blair
(74) *Attorney, Agent, or Firm*—Dean E. Wolf; Beyer Weaver LLP

(57) ABSTRACT

The present invention describes various techniques which may be used for determining multi-path latency in data networks which utilize a multi-homed transport protocols. Using the technique of the present invention, for example, appropriate source and destination addresses may be selected for specific IP datagrams in order to achieve an optimal communication path between endpoints which utilize a multi-homed transport protocol.

27 Claims, 8 Drawing Sheets

SCTP Common
Header Format

Fig. 8
ALL_DEST Table 800

| Seq. # | Arrival Timestamp | Destination IP Address | Source IP Address | Delta Value |
|---|---|---|---|---|
| n | T1 | IP-A | IP-X | 0 |
| n | T2 | IP-A | IP-Y | a |
| m | T3 | IP-B | IP-X | 0 |
| m | T4 | IP-B | IP-Y | b |

811a →
811b →
813a →
813b →

802, 804, 806, 808, 810

Fig. 9
Average One-Way Time Table 900

| Source IP Address | Destination IP Address | Average O-W Time | Variance |
|---|---|---|---|
| IP-X | IP-A | r | r' |
| IP-X | IP-B | s | s' |
| IP-Y | IP-A | t | t' |
| IP-Y | IP-B | u | u' |

ALL_SOUCE Table ~1000

| Seq. # | Sent Timestamp | Arrival Timestamp | HB Source IP Address | HB Destination IP Address | HB-ACK Destination IP Address | RTT |
|---|---|---|---|---|---|---|
| n | T1 | T2 | IP-A | IP-X | IP-A | a |
| n | T1 | T4 | IP-A | IP-X | IP-B | b |
| m | T3 | T6 | IP-B | IP-X | IP-A | c |
| m | T3 | T10 | IP-B | IP-X | IP-B | d |

Average RTT Time Table ~1100

| Round Trip Path | | | Average RTT | Variance |
|---|---|---|---|---|
| IP-A | IP-X | IP-A | r | r' |
| IP-A | IP-X | IP-B | s | s' |
| IP-B | IP-X | IP-A | t | t' |
| IP-B | IP-X | IP-B | u | u' |

1111 → 
1113 → 
1115 → 
1117 →

US 7,277,954 B1

TECHNIQUE FOR DETERMINING MULTI-PATH LATENCY IN MULTI-HOMED TRANSPORT PROTOCOL

BACKGROUND OF THE INVENTION

The present invention relates to data networks, and more specifically a technique for determining multi-path latency in data networks which utilize a multi-homed transport protocol.

Over the past decade, there has been a dramatic growth in the use of wide area networks such as the Internet for enabling communications among different computer systems. Traditionally, the primary transport protocol used to communicate between different host computers via the Internet is the well-known TCP protocol. The standardized TCP protocol may be used to establish a communication link between a single pair of IP addresses. Thus, for example, communication between 2 different host computer systems may be achieved using the TCP protocol, wherein a communication link is established between the 2 hosts using a specific pair of IP addresses which are associated with each respective host.

One problem with the conventional TCP protocol is that it is not designed to accommodate multiple IP addressed associated with a specific host. For example, if Host A has associated with it two IP addresses (e.g. IP-A, IP-B), and a communication link between Host A and Host Z is established using IP A, the communication link between Host A and Host Z will fail if IP-A goes down, regardless of whether IP-B is working properly.

Recently, newer transport protocols have been proposed which provide for multi-homed capability in order to allow the transport protocol to be aware of multiple IP addresses on each side of the connection. An example of a communication link which utilizes a multi-homed transport protocol is illustrated in FIG. 1 of the drawings. As illustrated in FIG. 1, a communication link is established between two endpoints (i.e., Host A, Host Z) of an IP network. Each endpoint in the connection has associated with it multiple IP addresses. For example, Host A 102 has two IP addresses associated with it, namely, IP-A and IP-B, and Host Z 104 has two IP addresses associated with it, namely, IP-X and IP-Y. Using a multi-homed transport protocol, communication between Host A and Host B may be achieved using any combination of IP addresses associated with each endpoint. For example, different source/destination pairs may include IP-A/IP-X, IP-A/IP-Y, IP-B/IP-X, IP-B/IP-Y, etc.

One type of multi-homed protocol which may be used in the system of FIG. 1 is the Stream Control Transmission Protocol (SCTP). Stream Control Transmission Protocol (SCTP) is viewed as a layer between the SCTP user application ("SCTP user" for short) and a connectionless packet network service such as IP. The basic service offered by SCTP is the reliable transfer of user messages between peer SCTP users. It performs this service within the context of an association between two SCTP endpoints.

SCTP is connection-oriented in nature, but the SCTP association is a broader concept than the TCP connection. SCTP provides the means for each SCTP endpoint to provide the other endpoint (during association startup) with a list of transport addresses (i.e., multiple IP addresses in combination with an SCTP port) through which that endpoint can be reached and from which it will originate SCTP packets. The association spans over all of the possible source/destination combinations which may be generated from each endpoint's lists. RFC 2960, "Stream Control Transmission Protocol," October 2000, authored by Stewart, et al., discloses the requirements for SCTP and specific packet formats, and is incorporated herein by reference for all purposes.

According to RFC 2960, an SCTP association is a protocol relationship between SCTP endpoints, composed of the two SCTP endpoints and protocol state information including Verification Tags and the currently active set of Transmission Sequence Numbers (TSNs), etc. An association can be uniquely identified by the transport addresses used by the endpoints in the association. An SCTP endpoint is the logical sender or receiver of SCTP packets. On a multi-homed host, an SCTP endpoint is represented to its peers as a combination of a set of eligible destination transport addresses to which SCTP packets can be sent and a set of eligible source transport addresses from which SCTP packets can be received. All transport addresses used by an SCTP endpoint typically use the same port number, but can use multiple IP addresses. A transport address is unique to an SCTP endpoint.

Because multi-homed protocols allow each endpoint of a connection to have multiple associated IP addresses, a number of issues arise relating to the selection of the source and destination addresses in an IP datagram. For example, the choice of the particular source address and destination address used in a packet may affect how quickly the packet arrives at the peer device, as well as how quickly the destination peer device generates a response. Accordingly, there exists a need to explore various issues relating to source and destination addresses selection in multi-homed protocols.

SUMMARY OF THE INVENTION

According to different embodiments of the present invention, various methods, devices and computer program products are described for providing communication between at least two endpoints in a data network. The data network includes a first endpoint adapted to communicate with a second endpoint using a multi-homed transport protocol. A first heartbeat message from a source device is received at a first address. The first heartbeat message includes a flag field. Information from the flag field is analyzed in order to determine an appropriate response to the first heartbeat message. Based upon the analysis of the flag field information, at least one appropriate heartbeat-ACK message is generated in response to the first heartbeat message. According to a specific embodiment, if the flag field information includes a first information code, a plurality of heartbeat-ACK messages may be transmitted from the first address to all or selected IP address destinations associated with the source. If the flag field includes second information code, a plurality of heartbeat-ACK messages may be transmitted from all or selected local IP addresses to the source (i.e., first source) address.

Alternate embodiments of the present invention are directed to various methods, devices and computer program products for determining path latency between at least two endpoints a in data network. The data network includes a first endpoint adapted to communicate with a second endpoint using a multi-homed transport protocol. A first heartbeat message is transmitted, at a first time T1, a from a first source address to a first destination address. The first heartbeat message includes a flag field, and is associated with a first sequence number. A plurality of heartbeat-ACK messages are received in response to the first heartbeat message. Information from the plurality of heartbeat-ACK messages is then used to determine or calculate path latency values associated with selected paths between the first and second endpoints. According to a specific embodiment, the path latency values may include, for example, average one-way time values and/or variances associated with selected one-way source-destination address paths, average roundtrip time values and/or variances associated with selected roundtrip source-destination address paths, etc. Using this information, specific source and destination addresses may then be selected which provide optimal communication paths between the first and second endpoints for different applications.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIGS. 8-11 illustrate a variety of different types of information which may be collected and/or generated according to various aspects of the present invention.

DETAILED DESCRIPTION OF THE PREFERRED EMBODIMENTS

The present invention describes various techniques which may be used for determining multi-path latency in data networks which utilize a multi-homed transport protocols. Using the technique of the present invention, for example, appropriate source and destination addresses may be selected for specific IP datagrams in order to achieve an optimal communication path between endpoints which utilize a multi-homed transport protocol. According to a specific implementation, a multi-homed transport protocol may be defined as a transport protocol which allows multiple IP addresses to be associated with at least one of the endpoints of the connection.

For purposes of illustration and clarity, the various aspects of the present invention will be described and illustrated using the Stream Control Transmission Protocol (SCTP), which is one type of multi-homed transmission protocol. However, it will be appreciated that the various aspects and techniques of the present invention may be modified and/or adapted for use with other multi-homed transport protocols such as, for example, the proposed data control protocol (DCP), etc. Such adaptations/modifications will generally be known to one having ordinary skill in the art.

Figure 2:
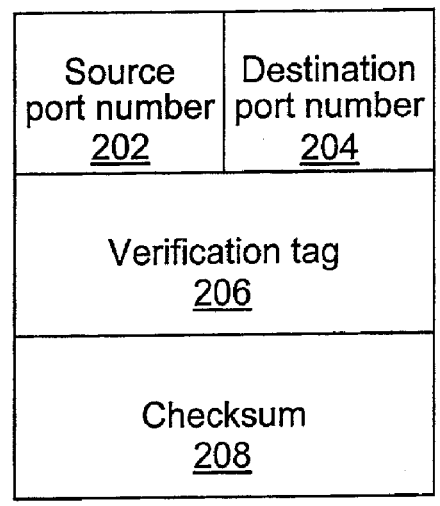
FIG. 2 is a diagram illustrating an exemplary SCTP common header format, in accordance with a specific embodiment of the present invention.

According to RFC 2960, an SCTP packet is the unit of data delivery across the interface between SCTP and the connectionless packet network (e.g., IP network). An SCTP packet typically includes a common SCTP header, possible SCTP control chunks, and user data encapsulated within SCTP data chunks. FIG. 2 is a diagram illustrating an exemplary SCTP common header format, according to a specific embodiment of the present invention. As shown in the embodiment of FIG. 2, the SCTP common header typically includes a source port number 202, destination port number 204, verification tag 206, and checksum 208. The verification tag 206 is a 32 bit unsigned integer that is randomly generated. The verification tag 206 provides a key that allows a receiver to verify that the SCTP packet belongs to the current association, and is not an old or stale packet from a previous association. The checksum 208 is similarly a 32 bit unsigned integer.

The SCTP packet as delivered to the lower layer includes a common header followed by one or more chunks. Each chunk may contain either user data or SCTP control information. The SCTP user has the option to request bundling of more than one user messages into a single SCTP packet. The chunk bundling function of SCTP is responsible for assembly of the complete SCTP packet and its disassembly at the receiving end. More particularly, a chunk is a unit of information within an SCTP packet, which includes a chunk header and chunk-specific content.

Figure 3:
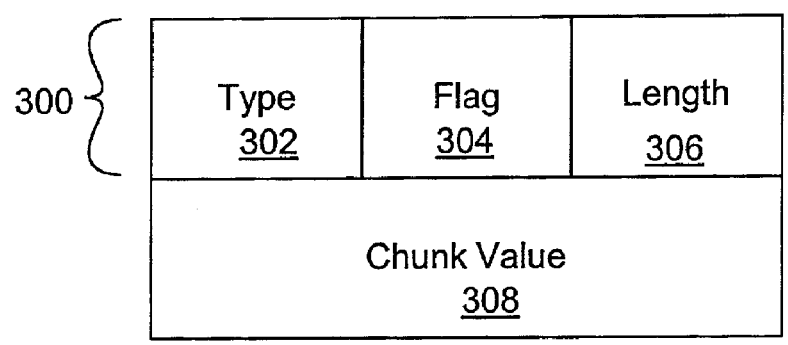
FIG. 3 is a diagram illustrating an exemplary chunk that may be transmitted in an SCTP packet, in accordance with a specific embodiment of the present invention.

FIG. 3 is a diagram illustrating an exemplary chunk that may be transmitted in an SCTP packet, in accordance with a specific embodiment of the present invention. As shown, a chunk header 300 includes a chunk Type field 302, chunk FLAG field 304, and a chunk LENGTH field 306. The chunk also includes a chunk VALUE portion 308. The chunk VALUE portion 308 may include a single value or multiple parameter values.

Figure 5:
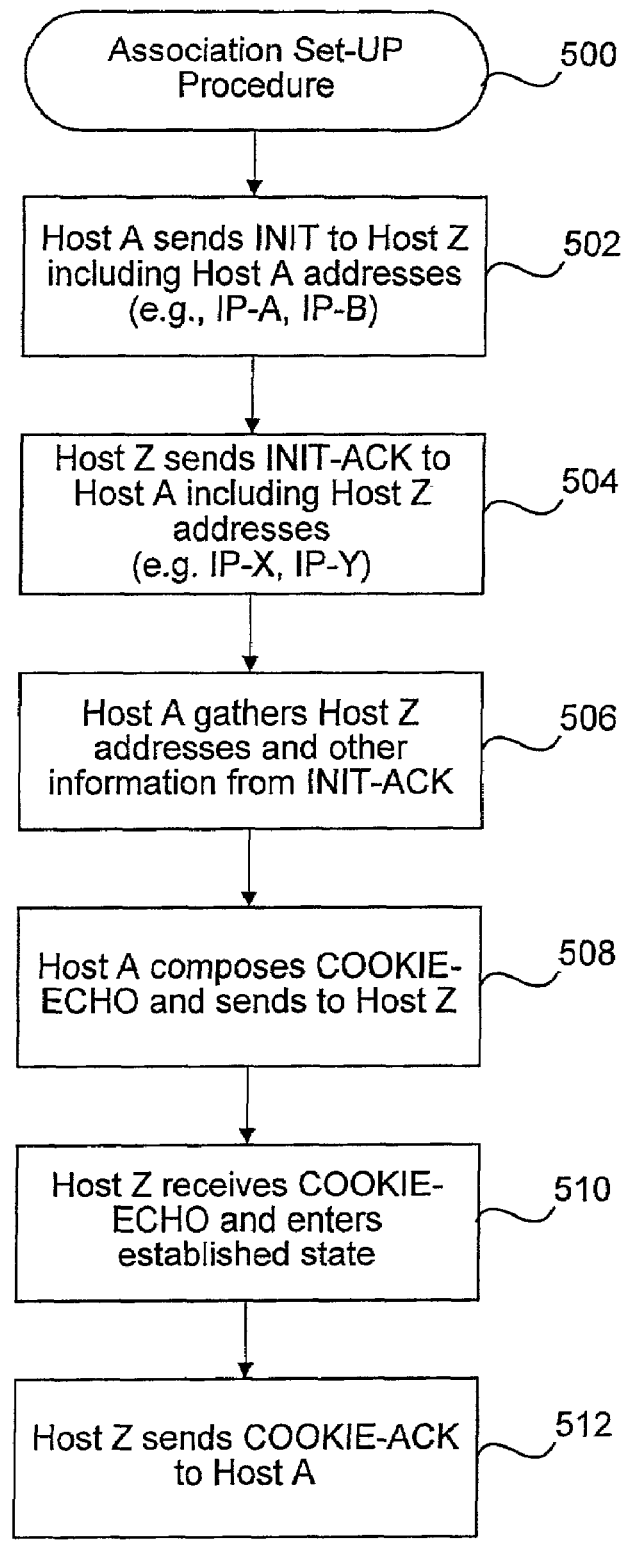
FIG. 5 shows a flow diagram illustrating an Association Set-Up Procedure 500 which may be implemented to set up an association between two endpoints of an SCTP connection.

FIG. 5 shows a flow diagram illustrating an Association Set-Up Procedure 500 which may be implemented to set up an association between two endpoints (e.g., Host A and Host Z of FIG. 1) of an SCTP connection. Such as association may initiated, for example, by a request from an SCTP user. As shown at block 502, Host A sends an INIT message to Host Z including Host A's IP addresses (e.g., IP-A, IP-B). Upon receipt of the INIT message by Host Z, Host Z sends (504) to Host A an acknowledgement message (INIT-ACK) which includes a security cookie including Host Z's addresses. A cookie mechanism is employed during the initialization to provide protection against various types of denial-of-service attacks. Upon receiving the INIT-ACK, Host A gathers (506) Host Z's address information and other information from the INIT-ACK message. Host A then composes (508) a COOKIE-ECHO message which includes the cookie received in the INIT-ACK message, and sends the COOKIE-ECHO message to Host Z. Host Z receives (510) the COOKIE-ECHO message and enters an appropriate state. Host Z then sends (512) a COOKIE-ACK message to Host A at block 512.

At association start-up, a primary path is defined for each SCTP endpoint (e.g., Hosts A and Z), and is used for normal sending of SCTP packets. The primary path is typically defined as the destination and source address that will be put into a packet outbound to the peer endpoint by default. Conventionally, the selection of the primary path may either be specified by the SCTP user, determined at random, or determined using the first IP addresses specified in each of the INIT and INIT-ACK messages. Moreover, there is currently no provision in the primary path selection process of conventional multi-homed transport protocols which takes into account transport and/or processing delays associated with specific source/destination addresses.

However, as stated previously, the choice of the particular source address and destination address used in an IP datagram (e.g., packet) may affect how quickly the IP datagram arrives at the peer device, and may also affect how quickly the destination device generates a response. Accordingly, as described in greater detail below, various aspects of the present invention are directed to techniques for determining appropriate source/destination address in order to help achieve, for example, optimal communication paths between the endpoints of a multi-homed transport protocol connection.

According to a specific embodiments of the present invention, the measurement of multi-path latency and/or variants may be determined by using modified heartbeat and heartbeat-ACK messages. For example, according to the conventional SCTP protocol, each endpoint may periodically send heartbeat messages at random intervals to selected destination IP addresses associated with the other endpoint in order to determine whether the selected IP addresses are alive and responsive. Typically, the destination IP addresses which are selected to receive heartbeat messages are all the non-primary path IP addresses.

The format of an SCTP heartbeat message is similar to the chunk format of FIG. 3. The Type field 302 of the heartbeat message will include a value which indicates that the chunk corresponds to a heartbeat message. Conventionally, the Flag field 304 of the SCTP heartbeat message is unused. That is, the Flag field 304 of the heartbeat message is conventionally set to zero by the sender and ignored by the receiver. When the receiver receives the heartbeat message, it generates and transmits a heartbeat-ACK message back to the sender. The sender then uses the heartbeat-ACK message to verify that the source address of the heartbeat-ACK message is functional and working properly.

Figure 1:
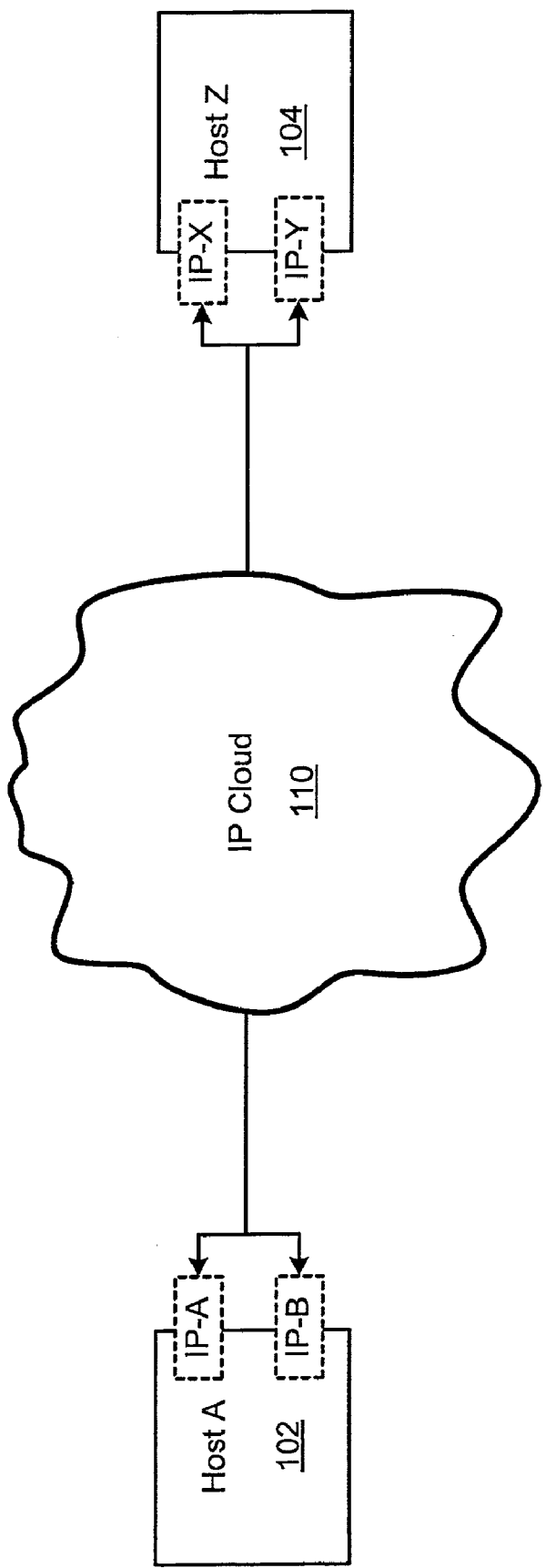
FIG. 1 shows an example of a communication link which utilizes a multi-homed transport protocol between two endpoints in an IP network.

Thus, it will be appreciated that, in the example of FIG. 1, Host A may send a first heartbeat message to address IP-X at host Z at time T1, and may send a second heartbeat message to address IP-Y at host Z at time T2. Similarly, Host Z may send a first heartbeat message to address IP-A at Host A at time T3, and may send a second heartbeat message to IP-B at Host A at time T4. When endpoint receives a heartbeat message, that host will respond by transmitting a heartbeat-ACK message back to the endpoint which sent the received heartbeat message.

It will be appreciated that, according to at least one embodiment, the number of heartbeat messages and heartbeat-ACK messages which are generated at each endpoint is proportional to the number of IP addresses associated with each endpoint. For this reason, in order to avoid cyclic congestion of network links, the SCTP protocol specifies that the heartbeat messages are to be transmitted at random intervals, rather than allowing a plurality of heartbeat messages to be transmitted simultaneously to different IP addresses at the other endpoint.

In contrast to conventional techniques, a specific embodiment of the present invention utilizes modified heartbeat messages which, in addition to being useable for performing conventional heartbeat functionality, are also useable for measuring one-way arrival time and/or roundtrip time for selected source-destination address pairs. As used in this application, the terms "modified heartbeat message" and "heartbeat message" may each refer to a variety of different types of heartbeat messages, which may include both conventional type heartbeat messages and special type heartbeat messages. Moreover, for purposes of describing various aspects of the present invention, the terms "heartbeat message" and "modified heartbeat message" may be used interchangeably.

According to a specific implementation, the special heartbeat messages of the present invention may include information in the Flag field 304 which may be used to cause the system or device receiving the special heartbeat messages to perform specific actions which are not performed by the conventional SCTP heartbeat/heartbeat-ACK protocol. For example, according to one embodiment, different types of heartbeat messages may be generated by including different values or codes in the Flag fields of the heartbeat messages. Each different code in the Flag field of the heartbeat message corresponds to a specific type of heartbeat message. For example, in one implementation, the various codes which may be inserted into the Flag field of the heartbeat message may include an ALL_DEST code, an ALL_SOURCE code, a NORMAL code, etc. The type of heartbeat message which is generated is related to the specific code which is included within the Flag field of the heartbeat message. For example, an ALL_DEST heartbeat message may be created by inserting an ALL_DEST code into the Flag field of the heartbeat message. An ALL_SOURCE heartbeat message may be created by inserting an ALL_SOURCE code into the Flag field of the heartbeat message. A normal (or conventional) heartbeat message may be created by inserting a NORMAL code (e.g. a zero value) into the Flag field of the heartbeat message.

According to a specific embodiment, when an endpoint receives a particular heartbeat message, its response will be dependent upon the specific code included within the Flag field of that heartbeat message. For example, according to one implementation, a NORMAL code will cause the receiver to generate a normal heartbeat-ACK message in accordance with the conventional heartbeat/heartbeat-ACK protocol such as that, described for example, by the SCTP protocol. An ALL_SOURCE code may cause the receiver to generate and send separate ALL_SOURCE heartbeat-ACK messages to each IP address associated with the device which sent the heartbeat message. An ALL_DEST code (which may also be referred to as an ALL_DESTINATION code) may cause the receiver to send separate ALL_DEST heartbeat-ACK messages to the source IP address (specified by the heartbeat message) from all local IP addresses at the endpoint which received the ALL_DEST heartbeat message.

Figure 6:
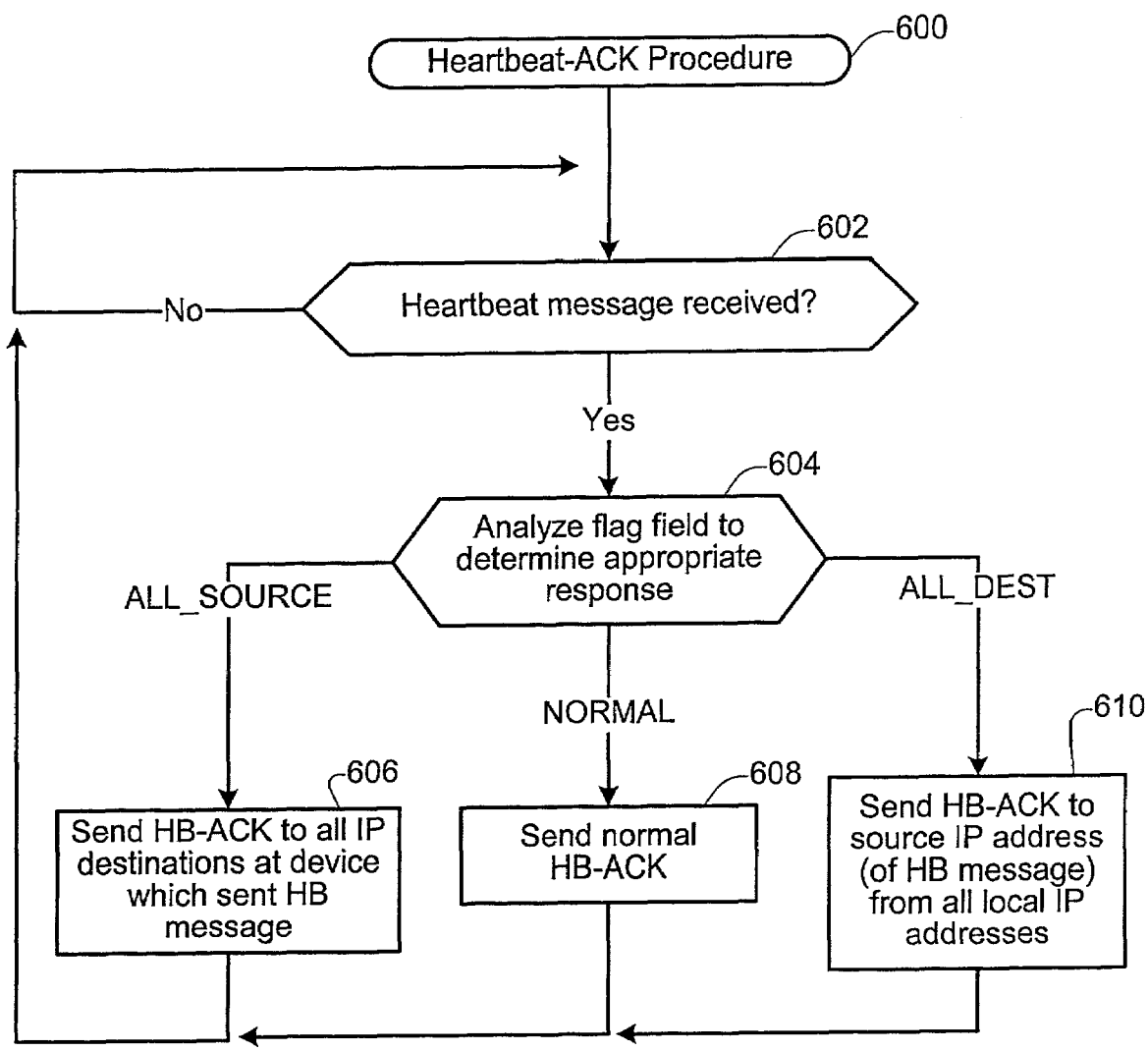
FIG. 6 shows a flow diagram of a Heartbeat-ACK Procedure 600 in accordance with a specific embodiment of the present invention.

FIG. 6 shows a flow diagram of a Heartbeat-ACK Procedure 600 in accordance with a specific embodiment of the present invention. According to one embodiment, the Heartbeat-ACK Procedure 600 may be implemented at an endpoint in response to receiving a heartbeat message. A separate instance of the Heartbeat-ACK Procedure 600 may be implemented at each endpoint of a multi-homed transport protocol connection. For purposes of illustration, the various aspects relating to the Heartbeat-ACK Procedure will be described by way of example using the system illustrated in FIG. 1. In this example, it is assumed that the Heartbeat-ACK Procedure 600 has been implemented at Host Z 104.

As shown at 602, the endpoint device which has implemented the Heartbeat-ACK Procedure waits to receive a heartbeat message. According to at least one implementation, the heartbeat message may correspond to a conventional type heartbeat message or a special type heartbeat message in accordance with different embodiments of the present invention.

Upon receipt of a heartbeat message, the Flag field of the received heartbeat message is analyzed (604) to determine an appropriate response. As shown in the embodiment of FIG. 6, if the contents of the Flag field of the received heartbeat message includes an ALL_SOURCE code, then the endpoint device generates one or more heartbeat-ACK (HB-ACK) messages, and sends (606) the HB-ACK messages to all IP address destinations associated with the device which sent the heartbeat message. For example, referring to FIG. 1, if Host Z receives an ALL_SOURCE heartbeat message (from Host A) at IP-X, Host Z will then send a separate HB-ACK message from IP-X to all of the IP address destinations (e.g. IP-A, IP-B) at Host A. According to a specific implementation, when an endpoint device receives an ALL_SOURCE heartbeat message, it should immediately respond by sending back one or more HB-ACK messages, preferably with little or no delays between each HB-ACK message. Alternatively, according to alternate embodiments, when an endpoint device receives an ALL_SOURCE heartbeat message, it may respond by sending back one or more HB-ACK messages with a fixed or variable delay between each HB-ACK message. Using information derived from the received HB-ACK messages, the endpoint which generated the heartbeat message (e.g. Host A) may be able to determine associated roundtrip times for selected roundtrip paths between the two endpoints. For example, when Host A receives the two HB-ACK messages from Host Z, it may then use the information from the HB-ACK messages to determine respective roundtrip times for the roundtrip paths of (IP-A)-(IP-X)-(IP-A) and (IP-A)-(IP-X)-IP-B).

Returning to FIG. 6, if the Flag field of the received heartbeat message includes an ALL_DEST code, then the endpoint receiving the ALL_DEST heartbeat message will generate one or more HB-ACK messages, and send (610) a separate HB-ACK message to the source IP address (specified in the heartbeat message) from all local IP addresses (i.e., all IP addresses associated with the endpoint receiving the heartbeat message). Thus, for example, referring to FIG. 1, if Host A sends an ALL_DEST heartbeat message from IP-A to IP-X at Host Z, Host Z will respond by sending a separate HB-ACK message from each of its local IP addresses (e.g. IP-X, IP-Y) to IP-A at Host A. According to a specific implementation, it is preferable that the HB-ACK messages be transmitted either simultaneously or with as little delay as possible between each HB-ACK message. Alternatively, according to alternate embodiments, it may be desirable that the HB-ACK messages be transmitted with a fixed or variable delay between each HB-ACK message. Using information derived from the received HB-ACK messages, the endpoint which sent the ALL_DEST heartbeat message is able to determine, for example, the one-way travel time associated with selected source-destination address pairs. For example, when Host A receives the ALL_DEST HB-ACK messages from Host Z, Host A may then use the information within the HB-ACK messages to determine a respective one-way travel time for the paths (IP-X)-(IP-A) and (IP-Y)-(IP-A).

It will be appreciated that the one-way and roundtrip travel times for other paths between the 2 endpoints may be determined by sending heartbeat messages to and from different IP addresses associated with each respective endpoint.

Returning to FIG. 6, if the information within the Flag field of the received heartbeat message corresponds to a NORMAL code (e.g. if the value of Flag field is equal to zero), then the endpoint receiving the heartbeat message will generate and send (608) a normal HB-ACK message to the endpoint device which sent the heartbeat message. After the appropriate HB-ACK message(s) have been sent, flow of the Heartbeat-ACK Procedure continues at 602, wherein the endpoint waits to receive another heartbeat message.

According to a specific implementation, each HB-ACK message which is generated in response to a given heartbeat message may include information which allows that HB-ACK message to be associated with the given heartbeat message. For example, in one implementation, the contents of the Flag field of the heartbeat message may be copied and inserted into an appropriate location (e.g. the Flag field) within the HB-ACK message. The endpoint device receiving the HB-ACK message may then use this information to identify the type of HB-ACK message received (e.g. ALL_SOURCE, ALL_DEST, NORMAL, etc.). In alternate embodiments, each HB-ACK message may also include other information originally included in the heartbeat message. An example of at least a portion of such other information is described in greater detail below with respect to FIGS. 8-11 of the drawings.

Figure 7:
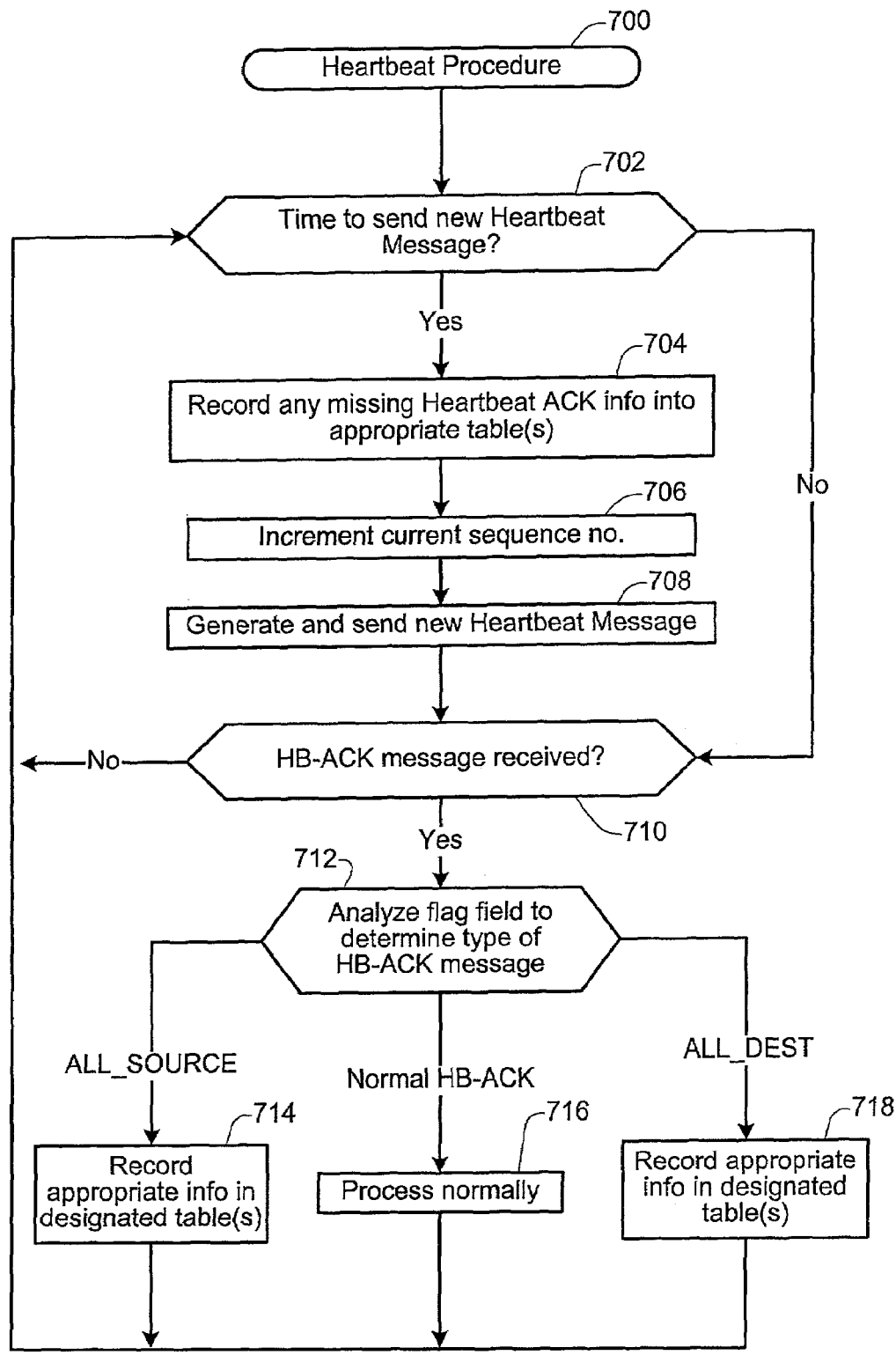
FIG. 7 shows a flow diagram of a Heartbeat Procedure 700 in accordance with a specific embodiment of the present invention.

FIG. 7 shows a flow diagram of a specific embodiment of a Heartbeat Procedure 700 which may be implemented by an endpoint device or system for generating heartbeat messages and/or for processing received HB-ACK messages. According to specific embodiments, a separate instance of the Heartbeat Procedure 700 may be implemented at each endpoint device in a multi-homed transport protocol connection. Initially, as shown at 702, the endpoint device determines whether it is time to send a new heartbeat message. According to a specific embodiment, each heartbeat message which is generated may include a different associated sequence number or other information used to identify that specific heartbeat message and any heartbeat-ACK messages which are received in response to that specific heartbeat message.

Upon determining that it is time to transmit a new heartbeat message, the device records (704) into appropriate table(s) any missing heartbeat-ACK information relating to unanswered or non-responsive heartbeat messages. For example, referring to FIG. 1, if Host A sent an ALL_DEST heartbeat message to Host Z, Host A should expect to receive back two HB-ACK messages from Host Z. If Host A has only received one HB-ACK message from Host Z, and now determines that it is time to send a new heartbeat message to Host Z, Host A may update or insert any missing information relating to the non-received heartbeat-ACK message into an appropriate table(s).

According to a specific implementation, such information may include predetermined minimum or maximum default values such as, for example, a maximum timestamp value, a maximum one-way travel time value, a maximum delta value, a maximum roundtrip travel time value, etc. In a specific implementation, the missing heartbeat-ACK information which is inserted into the table(s) may correspond to a most recently transmitted heartbeat message, which may be identified by a current sequence number parameter.

Once the appropriate table(s) have been updated with the default heartbeat-ACK information, the current sequence number may be incremented (706), and a new heartbeat message may then be generated (708) and sent. In specific embodiments where the sequence number corresponds to a timestamp value (derived from a timestamp counter or other clock source), the incrementing of the sequence number may occur automatically and/or independently of the Heartbeat Procedure 700.

According to different embodiments, the type of heartbeat message which is generated and sent may vary depending upon dynamic and/or predetermined criteria. For example, in one implementation, the type of heartbeat message which is generated may alternate between an ALL_DEST heartbeat message and an ALL_SOURCE heartbeat message. Alternatively, a different type of special heartbeat message (e.g., ALL_DEST, ALL_SOURCE) may be sent for every N normal heartbeat messages which are sent. In yet another embodiment, the selection of the type of heartbeat message which is generated may be related to dynamically changing network conditions and/or to application specific criteria.

After the new type of heartbeat message has been generated and sent, the endpoint device then waits to receive (710) HB-ACK message(s) until it is determined that it is time to send a new heartbeat message. When an HB-ACK message is received, the Flag field of the received HB-ACK message is analyzed (712) in order to determine the type of HB-ACK message received (e.g., ALL_SOURCE, ALL_DEST, NORMAL, etc.). If it is determined that the received HB-ACK message corresponds to an ALL_SOURCE HB-ACK message, then the information contained within the received HB-ACK message is recorded (714) into an appropriate table such as, for example, ALL_SOURCE Table 1000 of FIG. 10. If it is determined that the received HB-ACK message corresponds to an ALL_DEST HB-ACK message, then the information from the received HB-ACK message is recorded (718) into an appropriate table such as, for example, ALL_DEST Table 800 of FIG. 8. If it is determined that the received HB-ACK message corresponds to a normal or conventional HB-ACK message, the received HB-ACK message is processed normally. In one implementation, normal processing of the HB-ACK message may include calculating (716) a roundtrip time for the source-destination address pair specified in the HB-ACK message.

After the received HB-ACK message has been processed, a determination is made (702) as to whether it is time to send a new heartbeat message. Until it is determined that it is time to send a new heartbeat message, the endpoint device may continue to wait to receive (710) additional HB-ACK messages. Upon determining that it is time to send a new heartbeat message, any missing heartbeat-ACK information in the appropriate tables in recorded (704), and a new heartbeat message may then be generated, as described previously.

According to different embodiments of the present invention, each heartbeat message which is generated may include information relating to a variety of different parameters such as, for example, a timestamp value, a source IP address, a destination IP address, a sequence number, etc. According to one implementation, the timestamp value may correspond to a time when the heartbeat message was generated or transmitted by the endpoint device. In a specific implementation, a sequence number may optionally be included in order to provide a unique identifier for each particular heartbeat message which is generated. In one embodiment, the timestamp value of the heartbeat message may be used as the sequence number to uniquely identify that heartbeat message. In this latter embodiment, a separate sequence number (in addition to the timestamp value) need not be included in the heartbeat message.

FIGS. 8-11 illustrate a variety of different types of information which may be collected and/or generated according to various aspects of the present invention. For example, FIG. 8 shows an example of an ALL_DEST Table 800 which may be populated using the Heartbeat Procedure 700 of FIG. 7. FIG. 10 shows an example of an ALL_SOURCE Table 1000 which may also be populated using the Heartbeat Procedure 700 of FIG. 7.

According to one implementation, information from a received ALL_DEST HB-ACK message may be used to populate ALL_DEST Table 800. As shown in the embodiment of FIG. 8, each entry in the ALL_DEST Table 800 includes a sequence number 802, an arrival timestamp 804, a destination IP address 806 (corresponding to the destination IP address of the heartbeat-ACK message), a source IP address 808 (corresponding to the source IP address of the HB-ACK message), a delta value 810, etc.

According to a specific embodiment, the technique of populating the ALL_DEST Table 800 may be illustrated by way of example using the system shown in FIG. 1 of the drawings. In this example, it is assumed that Host A sends an ALL_DEST heartbeat message (having a sequence number=n) from source address IP-A to destination address IP-X at Host Z. In accordance with the heartbeat-ACK procedure 600, Host Z will respond to the ALL_DEST heartbeat message by sending two ALL_DEST HB-ACK messages to Host A. One ALL_DEST HB-ACK message will be sent from source address IP-X (at Host Z) to destination address IP-A (at Host A), and another ALL_DEST HB-ACK message will be sent from source address IP-Y (at Host Z) to destination address IP-A (at Host A). Preferably, according to a specific embodiment, the first and second HB-ACK messages are sent at substantially the same time, meaning that there is little or no delay between the sending of the two HB-ACK messages.

Because each HB-ACK message has a different source-destination address pair, it is possible for each HB-ACK message to traverse different routes through the network and/or take different amounts of time to traverse the network from the source address at Host Z to the destination address at Host A. Accordingly, it will be appreciated that each HB-ACK message may arrive at the destination address (e.g. IP-A at Host A) at different times. According to a specific embodiment, each time an HB-ACK message is received at the destination device, its arrival time may be recorded by way of an arrival timestamp value. Thus, for example, using the example above, if it is assumed that a first received ALL_DEST HB-ACK message (having a source address of IP-X and a destination address of IP-A) is received at time T1, and a second received ALL_DEST HB-ACK message (having a source address of IP-Y and a destination address of IP-A) is received at time T2, selected information associated with each received HB-ACK message may be recorded in the ALL_DEST Table 800 of FIG. 8, as illustrated by entries 811a and 811b.

As illustrated in the example of FIG. 8, each of the received HB-ACK messages corresponding to entries 811a and 811b are associated with the same sequence number (i.e., sequence number=n) which, according to a specific embodiment, corresponds to the sequence number of the ALL_DEST heartbeat message received at Host Z. The time at which each FIB-ACK message is received at the destination device may be recorded as its arrival timestamp value 804. The destination IP address 806 and source IP address 808 of each HB-ACK message may also be recorded. Additionally, a delta value 810 associated with each received HB-ACK message may be computed and recorded. According to a specific embodiment, the delta value 810 associated with a particular received HB-ACK message may correspond to the time difference between the time when that particular HB-ACK message was received and the time when a first received HB-ACK message of the same sequence number was received.

In the example of FIG. 8, it is assumed that the first received HB-ACK message of sequence number n (corresponding to entry 811a) was received at time T1. Since this is the first received HB-ACK message for sequence number n, its associated delta value is zero. As illustrated by entry 811b, the second received HB-ACK message associated with sequence number n was received at time T2. Accordingly, its associated delta value may be computed as T2−T1=a. If a subsequent HB-ACK message of sequence number n was received at time T5 (not shown), its associated delta value would be computed as T5−T1. As illustrated in FIG. 8, each set of received HB-ACK messages relating to a given sequence number may have its own set of relative delta values. Thus, for example, the delta values associated with entries 813a and 813b of FIG. 8 correspond to a different series of received ALL_DEST HB-ACK messages associated with sequence number m.

It will be appreciated that alternate embodiments of the ALL_DEST Table may include only a portion of the information illustrated in FIG. 8, and/or may include additional information not illustrated in FIG. 8. For example, according to one implementation, the delta value field 810 may be omitted, and the calculation of the delta value for each entry may be calculated using the relative arrival timestamp values. Alternatively, the arrival timestamp information may be omitted, and the respective delta value for each received ALL_DEST HB-ACK message may be dynamically computed at the time each message is received. Additionally, according to at least one embodiment, the destination IP address information may be omitted from Table 800 and derived based upon the sequence number associated with each entry.

According to a specific embodiment, the information recorded in Table 800 may be used to compute various parameters which represent a time average of network conditions. For example, FIG. 9 shows an example of an Average One-Way Time Table 900 in accordance with a specific embodiment of the present invention. Each entry in Table 900 provides an average one-way time value 906 and variance value 908 (e.g., standard deviation) for a selected source-destination address pairs. According to a specific embodiment, the one-way time value for a received ALL_DEST HB-ACK message may be calculated by comparing the difference in time from when the HB-ACK message was sent from the source device and received at the destination device. In one implementation, information relating to the time at which the HB-ACK message was sent from the source device may be included within the HB-ACK message.

The information stored in Table 900 may be derived, for example, from information stored in Table 800 of FIG. 8. According one implementation, the average one-way time values and variance values stored in Table 900 may be continually updated as new HB-ACK messages are received. The information stored in Table 900 may then be used to select a desired or optimal path (e.g., source IP address, destination IP address) for communicating between the two endpoint devices. For example, the variance in the arrival time of the ALL_DEST HB-ACK messages may be averaged and used to determine a desired return path to use for a selected destination. Additionally, if the communication between the two endpoint devices (e.g., Host A, Host Z) relates to IP telephony or other voice applications, it may be desirable to select a source-destination address pair which has a relatively low variance value. Alternatively, if the communication between the two endpoint devices involves the transmission of data, it may be desirable to select a source-destination pair which has a relatively low average one-way time value.

FIG. 10 shows an example of an ALL_SOURCE Table 1000 in accordance with a specific embodiment of the present invention. According to one implementation, the ALL_SOURCE Table 1000 may be populated during execution of the Heartbeat Procedure 700 of FIG. 7. For purposes of illustration, the sequence of events which result from the transmission of an ALL_SOURCE heartbeat message will be described by way of example with reference to the system of FIG. 1. In this example, it is assumed that Host A transmits an ALL_SOURCE heartbeat message from source address IP-A to destination address IP-X at Host Z. When Host Z receives the ALL_SOURCE heartbeat message, it responds by sending a separate HB-ACK message to each of the known IP addresses associated with Host A. According to one implementation, Host Z should respond immediately to the receipt of an ALL_SOURCE heartbeat message by transmitting the appropriate HB-ACK message(s) to Host A, preferably with little or no delay between transmission of each of the HB-ACK messages.

In the present example, Host Z will immediately respond to the received ALL_SOURCE heartbeat message by sending two HB-ACK messages to Host A, wherein one HB-ACK message is sent from IP-X to IP-A, and the other HB-ACK message is sent from IP-X to IP-B. When the HB-ACK messages are received at Host A, selected information from each of the messages may be retrieved and stored as separate entries (e.g. 1011a, 1011b) in ALL_SOURCE Table 1000. As illustrated in FIG. 10, the information which may be stored in ALL_SOURCE Table 1000 may include, for example, a sequence number 1002 (associated with the HB-ACK message), a sent timestamp 1004 corresponding to when the original heartbeat message was sent, an arrival timestamp 1006 corresponding to when the HB-ACK message was received, a source IP address 1008a of the associated heartbeat message, a destination IP address 1008b of the associated heartbeat message, a destination IP address 1008c of the received HB-ACK message, a roundtrip time value 1014 corresponding to the total roundtrip time or latency value associated with the particular roundtrip path specified by IP addresses 1008a-c, etc.

According to different implementations, portions of information illustrated in the table of FIG. 10 may be omitted and/or additional information (not shown) may be included. For example, the sent timestamp information 1004 and arrival timestamp information 1006 may be omitted, and the roundtrip time value 1014 may be dynamically computed at the time that each ALL_SOURCE HB-ACK message is received. Alternatively, the roundtrip time value 1014 may be eliminated from Table 1000 and computed, when desired, using the sent timestamp and arrival timestamp information. Additionally, the HB source IP address information 1008a may be omitted from Table 1000, for example, in embodiments where such information may be obtained using the sequence number information for each entry. In an alternate embodiment (not shown), a single table may be used to store the information illustrated in FIGS. 8 and 10 of the drawings.

According to different embodiments, portions of the information stored in the ALL_SOURCE Table 1000 of FIG. 10 may be used to derive time averaged parameters relating to various network conditions. For example, FIG. 11 shows an example of an Average Roundtrip Time Table 1100 in accordance with a specific embodiment of the present invention. As illustrated in FIG. 11, an average roundtrip time value 1104 and associated variance value 1106 may be computed for selected roundtrip paths 1102 using information stored in Table 1000 of FIG. 10. According one implementation, the average roundtrip time values and variance values stored in Table 1000 may be continually updated as new HB-ACK messages are received. According to a specific embodiment, the information stored in Table 1000 may be used to select a desired or optimal path (e.g., source IP address, destination IP address) for providing minimal delays to a given destination. the information stored in Tables 1000 or 1100 may also indicate any ingress filtering that either endpoint may experience.

In a specific embodiment, the above-described techniques may be repeated for different source and destination IP addresses so that one-way and/or roundtrip latency for all desired combinations of paths between the two endpoints may be measured.

OTHER EMBODIMENTS

Generally, the multi-homed transport protocol techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the multi-homed transport protocol technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, aspects of the present invention may be implemented in specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the multi-homed transport protocol technique of this invention may be implemented on a general-purpose network host machine such as a personal computer or workstation. Further, the invention may be at least partially implemented on a card (e.g., an interface card) for a network device or a general-purpose computing device.

Figure 4:
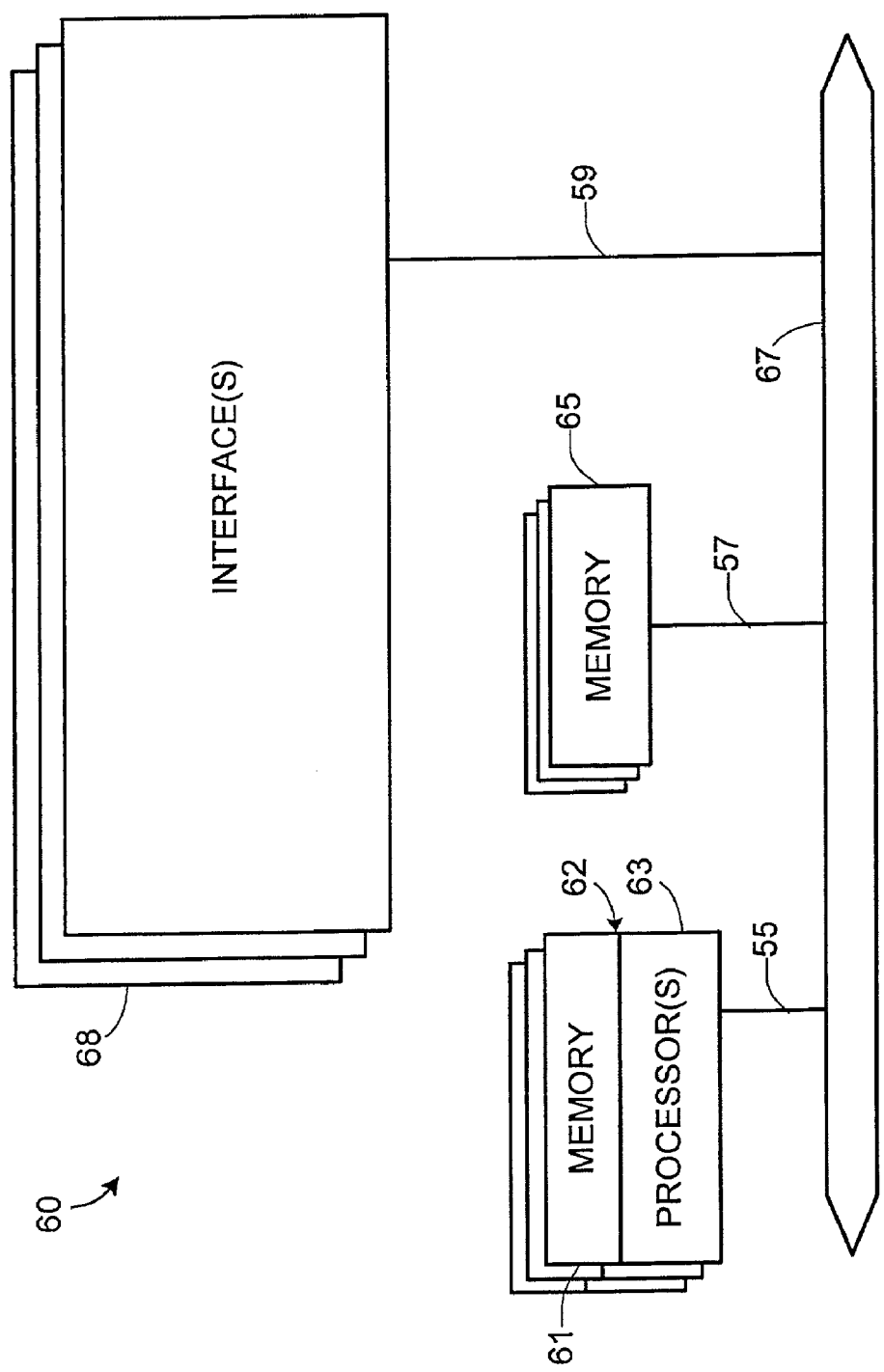
FIG. 4 shows a network device 60 suitable for implementing various aspects of the multi-homed transport protocol techniques of the present invention.

Referring now to FIG. 4, a network device 60 suitable for implementing the multi-homed transport protocol techniques of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as host device, the CPU 62 may be responsible for analyzing packets, encapsulating packets, forwarding packets to appropriate network devices, computing one-way and round trip time values, etc. The CPU 62 preferably accomplishes all these functions under the control of software including an operating system (e.g. Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 4 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the multi-homed transport protocol techniques described herein. The program instructions may control the operation of an operating system and/or one or more applications, for example. The memory or memories may also be configured to store data structures, path optimization data (e.g., data illustrated in FIGS. 8-11), and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

What is claimed is:

1. A method for communicating between at least two endpoints in a data network, the data network including a first endpoint adapted to communicate with a second endpoint using a multi-homed transport protocol, the method comprising:
   receiving, at a first address, a first heartbeat message from a source device, the first heartbeat message including a first field;
   analyzing information from the first field in order to determine an appropriate response to the first heartbeat message;
   transmitting at least one first heartbeat-ACK message from the first address to selected address destinations associated with the source in response to detecting first code information in the first field; and
   transmitting at least one second heartbeat-ACK message from selected local addresses to the first address in response to detecting second code information in the first field.

2. The method of claim 1 wherein each of said at least one first heartbeat-ACK messages includes said first code information.

3. The method of claim 1 wherein said at least one first heartbeat-ACK message includes a plurality of first heartbeat-ACK messages.

4. The method of claim 1 wherein the selected address destinations includes all known IP address destinations associated with the source.

5. The method of claim 1 wherein each of the first and second heartbeat-ACK messages is associated with said first heartbeat message.

6. The method of claim 1 further comprising transmitting the at least one first heartbeat-ACK messages in a manner such that there is no significant delay between the transmissions of each of the at least one first heartbeat-ACK messages.

7. The method of claim 1 further comprising transmitting the at least one first heart-ACK messages in a manner such that there is a predetermined delay between the transmissions of each of the at least one first heartbeat-ACK messages.

8. The method of claim 1 wherein each of said at least one second heartbeat-ACK messages includes said second code information.

9. The method of claim 1 wherein said at least one second heartbeat-ACK message includes a plurality of second heartbeat-ACK messages.

10. The method of claim 1 further comprising transmitting the at least one second heartbeat-ACK messages in a manner such that there is no significant delay between the transmissions of each of the at least one second heartbeat-ACK messages to the first address.

11. The method of claim 1 further comprising transmitting the at least one second heartbeat-ACK messages in a manner such that there is a predetermined delay between the transmissions of each of the at least one second heartbeat-ACK messages to the first address.

12. The method of claim 1 further comprising:
   transmitting, at a first time T1, the first heartbeat message from a first source address to a first destination address;
   the first heartbeat message being associated with a first sequence number;
   receiving a plurality of heartbeat-ACK messages in response to said first heartbeat message; and
   using information from said plurality of heartbeat-ACK messages to determine path latency values associated with selected paths between the first and second endpoints.

13. The method of claim 12 wherein each of the plurality of heartbeat-ACK messages is associated with said first sequence number.

14. The method of claim 12 further comprising:
   receiving, at time 12, a first heartbeat-ACK message of said plurality of heartbeat-ACK messages, said first heartbeat-ACK message being associated with a first one-way source-destination address path, and
   receiving, at time T3, a second heartbeat-ACK message of said plurality of heartbeat-ACK messages, said second heartbeat-ACK message being associated with a second one-way source-destination address path;
   wherein said first one-way sour destination address path is different than said second one-way source-destination address path.

15. The method of claim 14 further comprising:
   computing a delta value D for the second heartbeat-ACK message, said delta value D representing a time difference between time T2 and time T3.

16. A network device in a data network comprising:
   at least one processor;
   at least one interface configured or designed to provide a communication link to at least one other network device in the data network using a multi-homed transport protocol; and
   memory;
   the network device being operable to:
   receive, at a first address, a first heartbeat message from a source device, the first heartbeat message including a first field;
   analyze information from the first field in order to determine an appropriate response to the first heartbeat message;
   transmit at least one first heartbeat-ACK message from the first address to selected address destinations associated with the source in response to detect first code information in the first field; and
   transmit at least one second heartbeat-ACK message from selected local addresses to the first address in response to detect second code information in the first field.

17. The network device of claim 16 wherein each of said at least one first heartbeat-ACK messages includes said first code information.

18. The network device of claim 16 wherein said at least one first heartbeat-ACK message includes a plurality of first heartbeat-ACK messages.

19. The network device of claim 16 wherein the selected address destinations includes all known IP address destinations associated with the source.

20. The network device of claim 16 wherein each of the first and second heartbeat-ACK messages is associated with said first heartbeat message.

21. The network device of claim 16 being further operable to transmit the at least one first heartbeat-ACK messages in a manner such that there is no significant delay between the transmissions of each of the at least one first heartbeat-ACK messages.

22. The network device of claim 16 being further operable to transmit the at least one first heartbeat-ACK messages in a manner such that there is a predetermined delay between the transmissions of each of the at least one first heartbeat-ACK messages.

23. The network device of claim 16 wherein each of said at least one second heartbeat-ACK messages includes said second code information.

24. The network device of claim 16 wherein said at least one second heartbeat-ACK message includes a plurality of second heartbeat-ACK messages.

25. The network device of claim 16 being further operable to transmit the at least one second heartbeat-ACK messages in a manner such that there is no significant delay between the transmissions of each of the at least one second heartbeat-ACK messages to the first address.

26. The network device of claim 16 being further operable to transmit the at least one second heartbeat-ACK messages in a manner such that there is a predetermined delay between the transmissions of each of the at least one second heartbeat-ACK messages to the first address.

27. A system for communicating between at least two endpoints in a data network the data network including a first endpoint adapted to communicate with a second endpoint using a multi-homed transport protocol, the system comprising:

means for receiving, at a first address, a first heartbeat message from a source device, the first heartbeat message including a first field;

means for analyzing information from the first field in order to determine an appropriate response to the first heartbeat message;

means for transmitting at least one first heartbeat-ACK message from the first address to selected address destinations associated with the source in response to detecting first code information in the first field; and means for transmitting at least one second heartbeat-ACK message from selected local addresses to the fit address in response to detecting second code information in the first field.

* * * * *